United States Patent
Rod

(10) Patent No.: US 12,176,128 B2
(45) Date of Patent: Dec. 24, 2024

(54) SUBMARINE POWER CABLE

(71) Applicant: NEXANS, Courbevoie (FR)

(72) Inventor: Alf Erik Rod, Halden (NO)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 17/337,853

(22) Filed: Jun. 3, 2021

(65) Prior Publication Data

US 2021/0383949 A1   Dec. 9, 2021

(30) Foreign Application Priority Data

Jun. 5, 2020   (EP) .................................. 20305601

(51) Int. Cl.
| | | |
|---|---|---|
| *H01B 9/00* | (2006.01) | |
| *H01B 7/02* | (2006.01) | |
| *H01B 7/14* | (2006.01) | |
| *H01B 7/285* | (2006.01) | |
| *H01B 13/00* | (2006.01) | |

(52) U.S. Cl.
CPC ............. *H01B 7/14* (2013.01); *H01B 7/0225* (2013.01); *H01B 7/0291* (2013.01); *H01B 7/285* (2013.01); *H01B 9/00* (2013.01); *H01B 13/0006* (2013.01); *H01B 13/0036* (2013.01)

(58) Field of Classification Search
CPC ...................................................... H01B 9/027
See application file for complete search history.

(56) References Cited

U.S. PATENT DOCUMENTS

| | | | | |
|---|---|---|---|---|
| 1,904,887 | A | | 4/1933 | Parke |
| 3,479,446 | A | * | 11/1969 | Arnaudin, Jr. ......... H01B 13/22 264/171.18 |
| 3,794,752 | A | * | 2/1974 | Bunish .................. H01B 9/028 174/41 |
| 5,095,175 | A | * | 3/1992 | Yoshida ................ H01B 7/285 174/128.1 |
| 7,087,842 | B2 | * | 8/2006 | Belli ...................... H01B 7/288 174/113 R |
| 2016/0314874 | A1 | * | 10/2016 | Dreiner .................... H01B 3/46 |
| 2020/0135361 | A1 | | 4/2020 | Tyrberg et al. |

FOREIGN PATENT DOCUMENTS

JP   2017 123287   7/2017

* cited by examiner

*Primary Examiner* — Chau N Nguyen
(74) *Attorney, Agent, or Firm* — Sofer & Haroun, LLP

(57) ABSTRACT

A submarine power cable is provided having stranded conductor(s) and an insulation system, each individual stranded conductor, at given intervals, being compressed across an area to form a plurality of watertight partitions along a length of the of the submarine power cable. A method provides a plurality of watertight partitions along a length of the submarine power cable. The method includes, at a given point, arranging a compression tool around an outer circumference of the stranded conductor, using the compression tool to compress the stranded conductor, releasing the compression tool from the stranded conductor, and repeating the compression at a number of different points and using the compression tool to compress the stranded conductor at each of these points, thereby forming a plurality of watertight partitions along the length of the submarine power cable.

14 Claims, 4 Drawing Sheets

Stranded round
conductor

Profile wire
conductor

SUBMARINE POWER CABLE

RELATED APPLICATION

This application claims the benefit of priority from European Patent Application No. 20 305 601.5, filed on Jun. 5, 2020, the entirety of which is incorporated by reference.

FIELD OF THE INVENTION

The present invention relates to a submarine power cable comprising at least one conductor part. In particular, the present invention relates to a watertight conductor part and a method for manufacturing of the watertight conductor part.

BACKGROUND OF THE INVENTION

Electric cables are used to transport electricity. This may range from large submarine power cables operating at high voltage and medium voltage to small home cable, including distribution cables. All power cables include a conductive core.

Also, for larger cables, such as high voltage and medium voltage distribution cables and submarine cables, the cable may include a sheath configured to provide a water barrier to protect the insulated core. The sheath may also have a wire layer wound on the sheath to provide tensile strength to the cable as well as the physical armor.

Today, submarine power cables are using conductors of stranded design of different geometries. These conductors are incapsulated by an insulation system going seamlessly over the conductor, making an insulated cable phase. If such an insulation system is damaged, water or moisture may penetrate into the submarine cable over larger sections of the submarine power cable and thus disrupt the electrical properties of the submarine power cable.

To prevent the penetration of the water or moisture into the cable, the conductor part of the cable phase needs to be watertight. The purpose of a watertight submarine power cable is to replace only the damaged and wet part of the cable.

As such, the wet part of the submarine power cable needs to be as short as possible. In some cases, only a given length of cable is available as spare cable. If the damaged cable is wet for a long distance the spare cable might be too short.

There are several methods used to make the conductor watertight when the submarine power cable is manufactured. A filling material is filled inn between the strands of a stranded conductor to make the stranded conductor watertight. The filling material may, for instance, be a compound of elastic material, a swellable powder or swellable yarn, where the filling material may be used over an entire length or only part of the submarine power cable.

U.S. Pat. No. 1,904,887 relates to a submarine cable including a number of conductors along its length, where the conductors along a short portion of the stranded cable core length are separated from each other to provide open convolutions. This portion of the core is then treated with a waterproofing compound of a consistency which will thoroughly impregnate and waterproof the paper insulating material. Thereafter the portion of the core having the treated and separated conductors is placed in a suitable cavity of molding press and a composition is inserted in the mould cavity and around the conductors to fill all the spaces between the individual separated conductors. The press is then closed and simultaneously therewith the conductors are stretched taut by pulling the core at each end of the mould cavity and heat is applied to cure completely the composition and to provide a moisture resistant wall or plug across the diameter of the core. During the application of heat and pressure to form the plug, the core for a comparatively short distance at each side of the plug is also subjected to pressure to compact the core, but to a less degree than applied to form the plug.

CN 106486182 relates to a large-section water-blocking conductor for a submarine cable, where the large-section water-blocking conductor comprises a supporting core and where N round wire stranded layers are arranged at the outer side of the supporting core, wherein N is a natural number greater than or equal to 1, and where a plurality of round wire compressing stranded layers are arranged at the outer side of the round stranded layers and the round wire pressing stranded layers and shaped wire stranded layers are arranged in a staggered manner, where water-blocking layers are arranged between the round wire stranded layers, the round wire pressing stranded layers and the shaped wire stranded layers.

JP 2013004232 A relates to a running-water prevention type submarine power cable, where a conductor in which a water-tight compound is filled between element wires is compression-processed to be a circle, and under such condition as the water-tight compound is present on the surface of the conductor, a semiconducting type water absorption swelling tape is wound on the conductor. A gap between the conductor and the water absorption swelling tape is filled with the water-tight compound. A semiconducting binder tape is wound on the semiconducting water absorption swelling tape, and over them, an internal semiconductor layer and an isolating layer are extruded for covering. Since the gap between the conductor and the internal semiconductor layer is very small, water running at that portion can be prevented by the water absorption swelling tape. If the internal semiconductor layer is extruded for covering directly on the semiconducting water absorption swelling tape, the internal semiconductor layer is possible to foam because of water content in the water absorption swelling tape. To counter this, the semiconducting binder tape is provided, for preventing foaming of the internal semiconductor layer and easily performing extrusion covering of the internal semiconductor layer.

In general, it is challenging to know how far water and/or moisture will penetrate the conductor at different pressures.

There is thus a need for alternatives to today's submarine power cables, or at least supplementary solutions for submarine power cables.

An object of the present invention is to provide a submarine power cable which from a constructional point of view is simple and robust, and which may be used without the danger of collapse under various conditions.

OBJECTS OF THE INVENTION

A further object of the present invention is to seek to solve one or more of the problems or drawbacks according to prior art.

These objects are achieved with a submarine power cable and a method for providing a plurality of watertight partitions along a length of a submarine power cable as defined in the independent claims 1 and 11.

Advantageous embodiments of the present invention are indicated in the dependent claims.

Other objects and advantages of the present invention will more fully appear from the following detailed description taken in connection with the accompanying drawing, wherein:

SUMMARY OF THE INVENTION

The present invention relates to a submarine power cable that comprises at least one stranded conductor and an insulation system surrounding each individual stranded conductor, where each of the stranded conductors, at given intervals of the submarine power cable, is compressed across an area to form a plurality of watertight partitions along the length of the submarine power cable.

Each stranded conductor may comprise a plurality of metallic wires med, for example of aluminum, copper, other metals or different alloys, where the metallic wires are bundled or wrapped together to form the stranded conductor.

The stranded conductor may be manufactured in a variety of configurations, where the plurality of metallic wires is bundled or wrapped together to form a bunch stranding configuration, a concentric stranding configuration, an unilay stranding configuration or a rope lay stranding configuration.

Furthermore, the stranded conductor may have a circular cross-section, but it could also be envisaged that the stranded conductor may be manufactured to have other cross-sections, for instance a triangular cross-section, a square cross-section or even a polygonal cross-section.

According to one aspect, one or more clean stranded conductors are used when manufacturing the submarine power cable.

As used herein, the term "clean stranded conductor" means that a filling compound such as an elastic material, a swellable powder, a swellable yarn or the like is not filled in between the plurality of strands of the stranded conductor in order to provide a watertight conductor over an entire length or in sections of the submarine power cable, but that the submarine power cable according to the present invention solely may be made watertight through the compression, at given intervals, of the stranded conductor. This will provide a submarine power cable where the stranded configuration is deformed to a substantially solid configuration, thereby making the stranded conductor watertight in this compressed area. In case of damage of the submarine power cable, for instance under or after the installation of the submarine power cable, the water may penetrate into the submarine power cable. Such an ingress or intrusion of water will, however, be limited by two adjacent watertight partitions, whereby only a length between these two adjacent partitions would need to be replaced and/or repaired.

However, it could also be envisaged that a filling compound, for different applications of the submarine power cable, may be filled in between the plurality of strands of the stranded conductor, where the watertight partitions and the filling compound will provide a watertight conductor over an entire length or in sections of the submarine cable. The filling compound may be an elastic material, a swellable powder or the like.

In one aspect, the insulation system for the stranded conductor may comprise an inner semiconducting layer, an insulation layer and an outer semiconducting layer. The inner semiconducting layer, the insulation layer and the outer semiconducting layer may be bonded to each other or they may be separate layers that are applied onto the submarine power cable.

A compression tool, where the compression tool may be a hydraulic or pneumatic compression tool, may then be used when compressing the stranded conductor in order to provide a plurality of watertight partitions along the length of the submarine power cable.

A person skilled in the art will know that also other types of compression may be used when compressing the stranded conductor in order to provide the plurality of watertight portions along the length of the submarine power cable, for instance a weight or the like.

The compression tool may then be made to be able to provide the necessary compression of the stranded conductor, or the compression tool may be used with matrixes or dies that are adapted to suit a cross-section of the stranded conductor.

In one aspect, the matrixes or dies may be of a round or polygonal press type, where they will have two or four compression directions. However, the matrixes or dies may have more than the specified two or four compression directions.

Depending on the configuration of the submarine power cable, the area of application of the submarine power cable (i.e. which water depth it is to be used on the pressure or load it is subjected to) etc. the length of the area which is compressed may vary.

In one aspect, the area of each stranded conductor which is compressed may have a length between 1-1500 mm, more preferably a length between 10-1000 mm, even more preferably a length between 15-850 mm.

If the matrixes or dies used with the compression tool have a length (or width) that is smaller than the intended length of the area which is to be compressed, the compression may be done in several steps. The matrixes or dies will then be arranged around the outer circumference of the stranded conductor and the compression tool is used to compress a first part of the compression, whereafter the matrixes or dies are released and moved in the longitudinal direction of the stranded conductor to compress a subsequent part of the compression. This process will be repeated until the length of the compression is obtained. Thereafter the same is repeated for each area which is to be compressed in order to provide a watertight partition.

In one aspect, each stranded conductor may have a circular, a square, a triangular or a polygonal cross-section before the compression of the stranded conductor. After the stranded conductor has been compressed, to deform the stranded configuration to a substantially solid configuration, the compressed area of the stranded conductor may have the same cross-section as before the compression of the stranded conductor. However, it could also be envisaged that the compressed area of the stranded conductor may have a different cross-section after the compression of the stranded conductor. If the stranded conductor, for instance, has a circular cross-section before the compression of the stranded conductor, the stranded conductor may have a polygonal or a square cross-section after the compression of the stranded conductor.

In one aspect, the wires of the stranded conductor may be made from aluminum, copper or other metals of combinations thereof.

In one aspect, the stranded conductor will have a substantially solid configuration in the area which is compressed.

In one aspect, the stranded conductor is continuous along the length of the submarine power cable.

The present invention also related to a method for providing a plurality of watertight partitions along a submarine cable according to the present invention, where the method comprises the following steps:
- at a given point of the length of the submarine power cable, to arrange a compression tool around an outer circumference of the stranded conductor,
- to use the compression tool to compress the stranded conductor across an area,
- to release the compression tool from the stranded conductor,
- to repeat the arranging of the compression tool around the outer circumference of the stranded conductor at a number of different points and compressing the stranded conductor at these points, thereby forming a plurality of watertight partitions along the length of the submarine cable.

The method may further comprise the following step:
- to compress the stranded conductor to a substantially solid configuration.

The compression of the watertight partition may also be done in several step, whereby the compression is done in several steps, in order to obtain the desired length of the watertight partition.

The method may also comprise the following step, before the compression of the stranded conductor is done, to arrange a thin sleeve or casing over the area which is to be compressed, compression both the thin sleeve or casing and the stranded conductor, in order to provide the stranded conductor with a substantially equal diameter over the length of the stranded conductor.

BRIEF DESCRIPTION OF THE DRAWINGS

Other advantages and characteristic features of the present invention will be seen clearly from the following detailed description, the appended figures and the following claims, wherein:

DETAILED DESCRIPTION

Figure 1A:
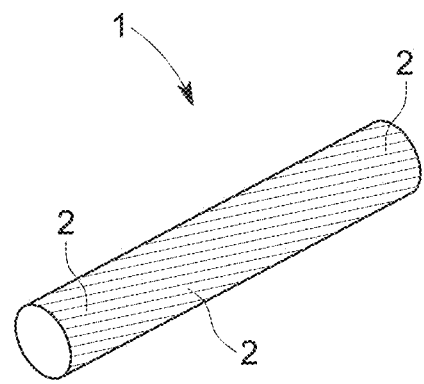
FIGS. 1A-1C illustrate perspective and cross-sectional views of a stranded conductor according to the present invention.
Figure 1B:
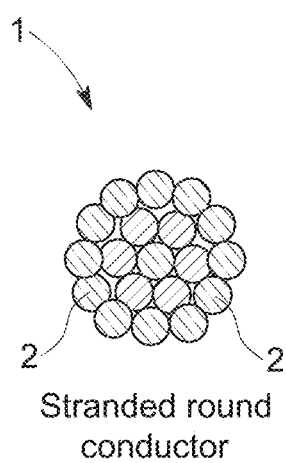
Figure 1C:
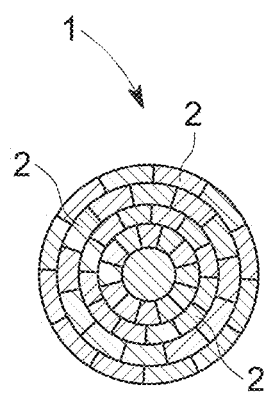

FIGS. 1A-1C illustrate different embodiments of a stranded conductor 1 of a submersible power cable according to the present invention, where FIG. 1A shows the stranded conductor 1 in a perspective view, while FIGS. 1B-1C show the stranded conductor 1 in a cross-sectional view.

The stranded conductor 1 comprises a plurality of metallic wires 2, where the metallic wires 2 are bundled or wrapped together to form the stranded conductor 1.

The plurality of metallic wires 2 of the stranded conductor 1 may be arranged together in a variety of configurations, for instance in a bunch stranding, a concentric stranding, an unilay stranding or a rope lay stranding. A person skilled in the art would know how this can be done, whereby this is not described any further herein.

It can also be seen from FIGS. 1B and 1C that the metallic wires 2 of the stranded conductor 1 may have different profile or cross-section.

The plurality of metallic wires 2 are made of aluminium, copper, different alloys or combinations thereof.

Although the stranded conductor 1 in the embodiment according to FIGS. 1A-1C is shown to have a substantially circular form or cross-section, it should be understood that the stranded conductor 1 may also have other forms, for instance a triangular, square or polygonal cross-section.

According to the present invention, the submarine power cable comprises a plurality of clean, stranded conductors 1, meaning that a filling compound such as an elastic, a swellable powder or yarn or the like is not filled in between voids or spaces of the metallic wires 2 in order to provide a watertight conductor over an entire length or sections of the submarine power cable. Instead the stranded conductor 1 is made watertight through a compression, at given intervals, of the stranded conductor.

Such a compression of the submarine power cable at different intervals, will provide a plurality of watertight partitions along the length of the submarine power cable, whereby an ingress or intrusion of water, will be limited by two adjacent watertight partitions, whereby only the length between these two adjacent watertight partitions can be filled with water and as such, only this part of the submarine power cable would need to be replaced and/or repaired.

Figure 2:
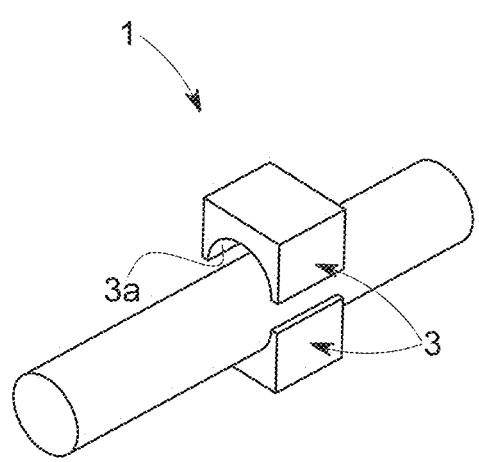
FIG. 2 illustrates use of a compression tool on a stranded conductor according to FIG. 1.

FIG. 2 shows how two matrixes 3 or dies, the matrixes 3 or dies in appropriate ways being connected to a compression tool (not shown) can be used to provide the plurality of watertight partitions 4 along the length of the stranded conductor 1.

Each matrix 3 or die will have a cut-out 3a or recess facing the stranded conductor 1, when the two matrixes 3 or dies are arranged around the stranded conductor 1, where this cut-out 3 or recess has a corresponding form as the stranded conductor 1. However, the diameter of the matrixes 3 or dies, when placed together, will be somewhat smaller that a diameter of the stranded conductor 1.

FIG. 2 shows that the stranded conductor 1 has a circular cross-section, whereby the cut-out 3 or recess in each matrix 3 or die will have a form of a semicircle.

If the stranded conductor 1 has a polygonal form, the cut-out 3 or recess in each will have a shape or form that corresponds to half of the polygonal form of the stranded conductor 1.

When the two matrixes 3 or dies are arranged over and under the stranded conductor 1, the compression tool is used to compress the two matrixes 3 or dies together, this also resulting in that the stranded conductor 1 is compressed in this area.

The compression of the stranded conductor 1 will result in that the metallic wires 2 of the stranded conductor 1 are compressed to such a degree that the stranded conductor 1 in this area is made substantially solid, such that water cannot penetrate through the stranded conductor when an insulation system is arranged around the outer circumference of the stranded conductor 1.

Such an insulation system may, for instance, comprise an inner semiconducting layer 5 arranged around the stranded conductor 1, a solid insulation layer 6 arranged around the inner semiconducting layer and an outer semiconducting layer 7 arranged around solid insulation layer 6.

The matrixes 3 or dies may have two or four compression directions.

Figure 3:
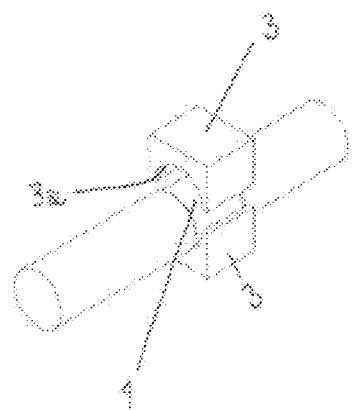
FIG. 3 illustrates removal of the compression tool according to FIG. 2.

When the compression is finished, as seen in FIG. 3, the compression tool is used to release the two matrixes 3 or dies from each other and the stranded conductor 1. A watertight partition 4 is then provided in the stranded conductor 1.

How long a length of such a watertight partition 4 is, will depend on the configuration of the submarine power cable, the area of application of the submarine cable or the like.

For instance, if the submarine power cable according to the present invention is to be used at large water depths, exposing the cable for large pressures, or the submarine power cable is to be used in harsh environment and thereby subjected to large loads, the length of the watertight partition 4 may be longer that if the submarine power cable is subjected to smaller loads.

Depending on the configuration of the submarine power cable, the area of application of the submarine power cable (i.e. which water depth it is to be used on the pressure or load it is subjected to) etc. the length of the area which is compressed may vary.

Furthermore, the plurality of watertight partitions 4 that are provided over the length of the stranded conductor 1 may have the same length, but it could also be envisaged that some of the watertight partitions 4 may be provided with a different length.

If the matrixes 3 or dies used with the compression tool have a length (or width) that is smaller than the intended length of the area which is to be compressed, the compression may be done in several steps. The matrixes 3 or dies will then be arranged around the outer circumference of the stranded conductor 1 and the compression tool is thereafter used to compress a first part of the watertight partition 4, whereafter the matrixes 3 or dies are released and moved in the longitudinal direction of the stranded conductor 1 to compress a subsequent part of the watertight partition 4. This process will be repeated until the desired length of the watertight partition 4 is obtained. Thereafter the same is repeated for each area which is to be compressed in order to provide a watertight partition 4.

For instance, if the length of a watertight partition 4 is to be 850 mm and the matrixes 3 or dies have a length (or width) that is only 212.5 mm, then the stranded conductor 1 must be compressed four times in order to provide a watertight partition 4 having a length of 850 mm.

Figure 4:
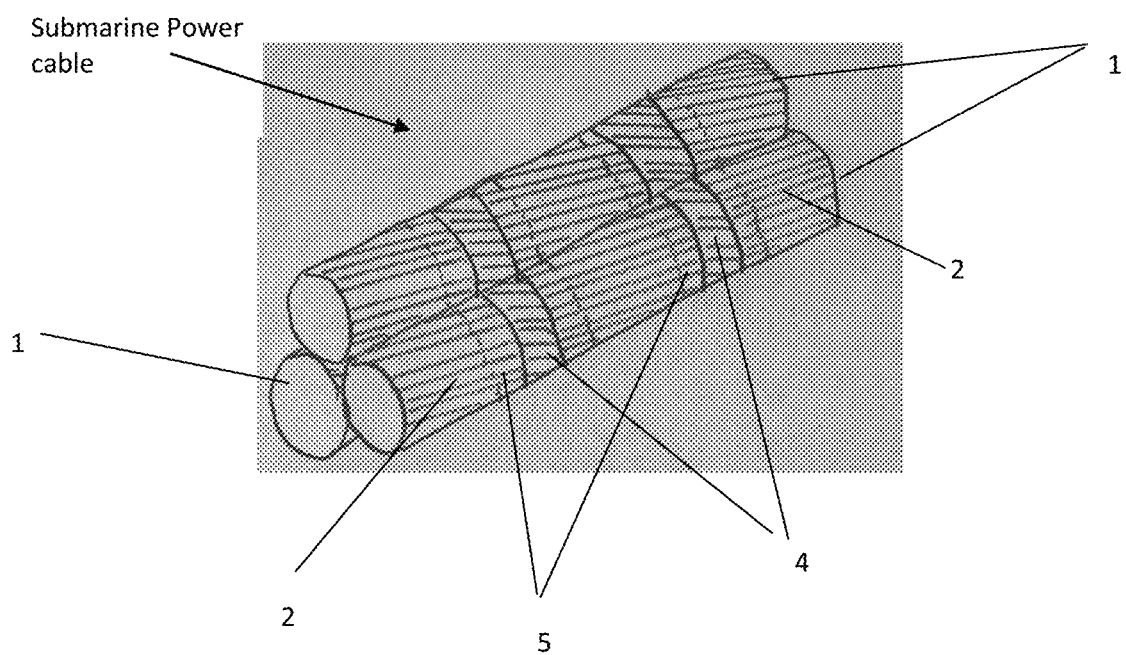
FIG. 4 illustrates the stranded conductor according to FIG. 1, where the stranded conductor is provided with a watertight partition.
Figure 5:
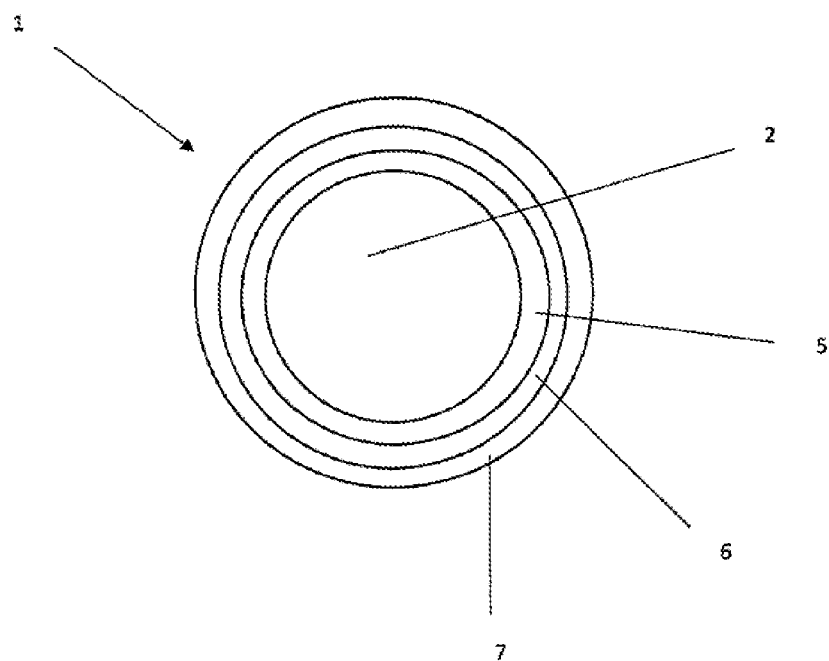
FIG. 5 illustrates the stranded conductor and insulation system.

FIG. 4 shows the stranded conductor 1 after the compression process is complete and the compression tools and matrixes 3 or dies are removed.

As the stranded conductor 1 has been compressed in this area to a substantially solid configuration, the watertight partition 4 will have a smaller diameter than the areas of the stranded conductor 1 which are not compressed.

It could be envisaged that the stranded conductor 1 also could be provided with a thin sleeve or casing 5 over the area that is to be compressed before the compression of the stranded conductor 1, as shown in FIG. 4, whereafter both the thin sleeve or casing 5 and the stranded conductor 1 are compressed together by using the compression tool. When the compression is done, the stranded conductor 1 is compressed to a substantially solid configuration, while the thin sleeve or casing 5 will be in level or in line with the stranded conductor 1 which is not compressed, thereby providing a stranded conductor with a substantially equal diameter over the length of the stranded conductor 1.

Furthermore, for the sake of simplicity, only one watertight partition 4 is shown provided on the stranded conductor 1, but it should be understood that a plurality of such watertight partitions 4 will be provided spaced apart from each other and over the entire length of the stranded conductor 1.

The invention has now been explained with several non-limiting exemplary embodiments. One skilled in the art will appreciate that a variety of variations and modifications can be made to the submarine power cable and the method for providing a plurality of watertight partitions along a length of a submarine power cable as described within the scope of the invention as defined in the appended claims.

The invention claimed is:

1. A submarine power cable comprising:
    a plurality of stranded conductors, each stranded conductor being formed of a plurality of metallic wires; and
    an insulation system surrounding each stranded conductor,
    wherein each stranded conductor, at given intervals of the submarine power cable, is compressed to a substantially solid configuration across an area to form a plurality of watertight partitions along a length of the submarine power cable,
    wherein each said insulation system comprises an inner semiconducting layer, a solid insulation layer and an outer semiconductor layer,
    wherein at least one stranded conductor of said plurality of stranded conductors within said submarine power cable is without filling compound in between voids or spaces of the metallic wires forming a clean stranded conductor, and
    wherein each stranded conductor has a thin sleeve or casing over the area that is compressed, such that where each stranded conductor is compressed to the substantially solid configuration, the thin sleeve or casing is level with, or in line with, area of each stranded conductor which is not compressed, thereby providing each stranded conductor with a substantially equal diameter over the length of each stranded conductor.

2. The submarine power cable according to claim 1, wherein the plurality of metallic wires forming each stranded conductor of said plurality of stranded conductors are bundled or wrapped together to form a bunch stranding, a concentric stranding, an unilay stranding or a rope lay stranding.

3. The submarine power cable according to claim 2, wherein the metallic wires are made from aluminum, copper, other metals or a combination thereof.

4. The submarine power cable according to claim 1, wherein the area which is compressed has a length between 1-1500 mm.

5. The submarine power cable according to claim 4, wherein the area which is compressed has a length between 10-1000 mm.

6. The submarine power cable according to claim 4, wherein the area which is compressed has a length between 15-850 mm.

7. The submarine power cable according to claim 1, wherein each stranded conductor has a circular, triangular or polygonal cross-section.

8. The submarine power cable according to claim 1, wherein each stranded conductor is continuous along the length of the submarine power cable.

9. A method for providing the plurality of watertight partitions along the length of the submarine power cable according to claim 1, wherein said method comprises the following step:
    at one of the intervals of the length of the submarine power cable, arranging a compression tool around an outer circumference of each stranded conductor,
    using the compression tool to compress each stranded conductor across the area, releasing the compression tool from each stranded conductor, repeating the arranging of the compression tool around the outer circumference of each stranded conductor at other ones of the intervals and using the compression tool to compress each stranded conductor at each of said other intervals, thereby forming the plurality of watertight partitions along the length of the submarine power cable.

10. The method according to claim 9, wherein the method further comprises the following step:

compressing each stranded conductor to the substantially solid configuration.

11. The method according to claim 9, wherein the method further comprises the following step:

performing the compression in several step, in order to obtain a desired length of the watertight partition.

12. The method according to claim 9, wherein the method further comprises, before the compression of each stranded conductor the following step:

arranging the thin sleeve or casing over an area which is to be compressed, compressing both the thin sleeve or casing and the stranded conductor, in order to provide each stranded conductor with a substantially equal diameter over the length of each stranded conductor.

13. The submarine power cable according to claim 1, wherein the submarine power cable is a medium or high voltage cable.

14. The submarine power cable according to claim 1, wherein the inner semiconducting layer is arranged around the metallic wires, the solid insulation layer is arranged around the inner semiconducting layer and the outer semiconducting layer is arranged around the solid insulation layer.

* * * * *